United States Patent [19]
Walsh et al.

[11] 3,992,222
[45] Nov. 16, 1976

[54] METALLIC SULFIDE ADDITIVES FOR POSITIVE ELECTRODE MATERIAL WITHIN A SECONDARY ELECTROCHEMICAL CELL

[75] Inventors: William J. Walsh, Naperville; Charles C. McPheeters, Plainfield; Neng-ping Yao, Clarendon Hills; Kobuyuki Koura, Hinsdale, all of Ill.

[73] Assignee: The United States of America as represented by the United States Energy Research and Development Administration, Washington, D.C.

[22] Filed: July 15, 1975

[21] Appl. No.: 596,044

[52] U.S. Cl. .............................. 429/221; 429/207
[51] Int. Cl.² ........................................ H01M 4/38
[58] Field of Search ............. 136/25, 6 F, 6 LF, 20, 136/23, 28, 6 LN

[56] References Cited
UNITED STATES PATENTS
3,898,096   8/1975   Heredy et al. ................... 136/6 LF Primary Examiner—John H. Mack
Assistant Examiner—C. F. Lefevour
Attorney, Agent, or Firm—Dean E. Carlson; Arthur A. Churm; Hugh W. Glenn

[57] ABSTRACT

An improved active material for use within the positive electrode of a secondary electrochemical cell includes a mixture of iron disulfide and a sulfide of a polyvalent metal. Various metal sulfides, particularly sulfides of cobalt, nickel, copper, cerium and manganese, are added in minor weight proportion in respect to iron disulfide for improving the electrode performance and reducing current collector requirements.

2 Claims, 5 Drawing Figures

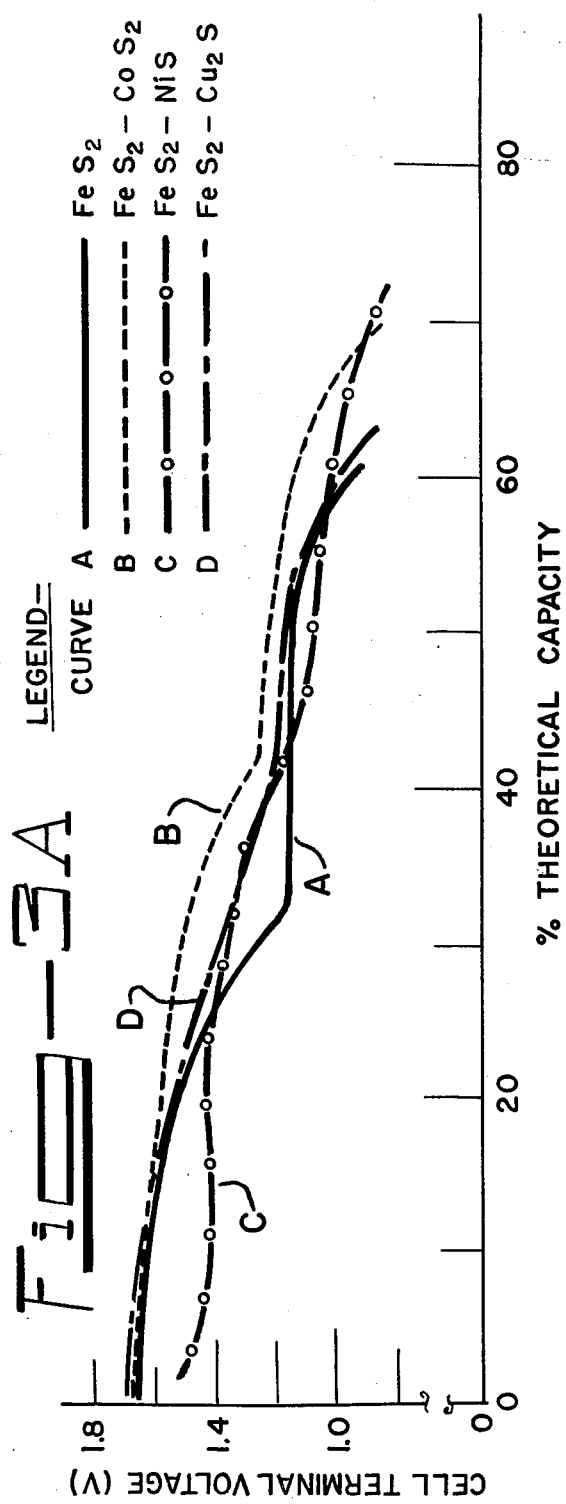
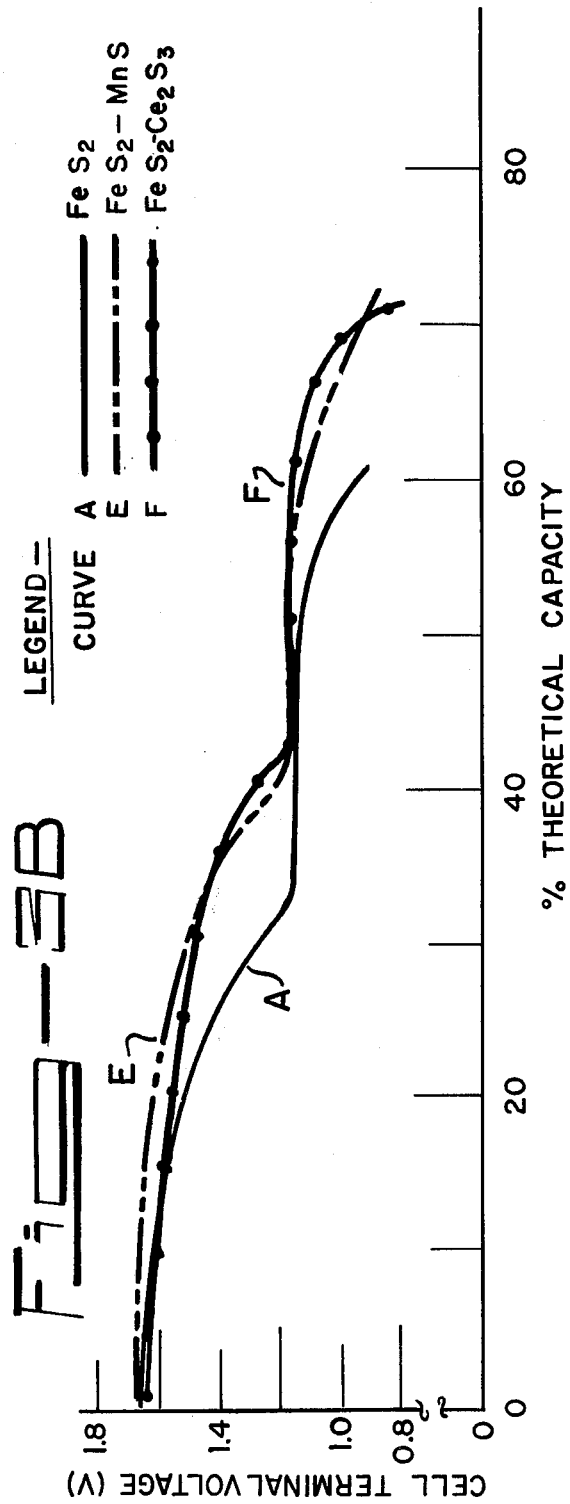

METALLIC SULFIDE ADDITIVES FOR POSITIVE ELECTRODE MATERIAL WITHIN A SECONDARY ELECTROCHEMICAL CELL

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to high-temperature, secondary electrochemical cells and batteries of such cells that can be employed as power sources for electrical automobiles, hybrid electric vehicles or for the storage of energy generated during intervals of off-peak power consumption. It is particularly applicable to electrochemical cells that employ metal sulfides as positive electrode reactants and alkali metals as negative electrode reactants.

A substantial amount of work has been done on the development of these types of electrochemical cells and their electrodes. The various type cells showing promise have employed lithium, lithium-aluminum alloy or sodium as the reactant or active material within the negative electrode. In the positive electrode, the chalcogens, particularly sulfur and sulfur compounds, have been used. Electrolytes of molten salt, generally containing the ions of the negative reactant, provide ionic conduction between the electrodes. Examples of these secondary, high-temperature cells are disclosed in U.S. Pat. No. 3,887,396 to Walsh et al. entitled "Modular Electrochemical Cell", June 3, 1975; U.S. Pat. No. 3,884,715 to Cairns et al. entitled "Secondary Electrochemical Power Producing Cells Having Mixed Cathode Compositions, May 20, 1975; U.S. Pat. No. 3,827,910 to Cairns et al. entitled "Homogeneous Cathode Mixtures for Secondary Electrochemical Power-Producing Cells", Aug. 6, 1974; U.S. Pat. No. 3,716,409 to Cairns et al., entitled "Cathodes for Secondary Electrochemical Power-Producing Cells", Feb. 13, 1973; and U.S. Pat. No. 3,488,221 to Hiroshi Shimotake et al., Jan. 6, 1970. A number of other patent applications relating to these type cells include ERDA Case No. S-44,319, Ser. No. 434,459 now U.S. Pat. No. 3,907,589, issued Sept. 23, 1975, by Gay and Martino, entitled "Cathode for a Secondary Electrochemical Cell"; and Ser. No. 510,840, filed Sept. 30, 1974 by Yao and Walsh, entitled "Electrochemical Cell Assembled in Discharged State" now U.S. Pat. No. 3,947,291 Mar. 30, 1976. Each of these patents and patent applications are assigned to the assignee of the present application.

The iron sulfides $FeS_2$ and $FeS$ have been found to be particularly attractive sulfur compounds for use as positive electrode reactants. These materials are readily available and are much more easily contained within the cell than elemental sulfur. Although $FeS_2$ has a lower equivalent weight and generally performs better within the positive electrodes than $FeS$, it reacts with and degrades iron components within the cell to form $FeS$. Consequently, inert materials such as molybdenum, tungsten or carbon are required for use in current collectors and electrical terminals in contact with $FeS_2$ cathode compositions. Unfortunately, these materials are difficult to weld and otherwise fabricate into useful structures. Molybdenum in particular has been extensively used as a current collector with $FeS_2$ positive electrodes. This current collector material contributes substantially to the weight and cost of the cell.

Various other problems have been encountered in the development of iron disulfide positive electrodes. A substantial volume increase occurs as this active positive electrode material reacts with lithium ions within the electrolyte to form lithium sulfide reaction product. The expansion may rupture or deform the electrode containment to reduce cell performance. In addition, various intermediate phases are formed within the positive electrode, for instance solid phases of $Li_2FeS_2$, $Li_4Fe_2S_5$, etc. Certain of these phases may interfere with the efficient utilization of the electrode active materials.

SUMMARY OF THE INVENTION

Therefore, in view of these problems associated with the development of iron disulfide as positive-electrode active material, it is an object of the present invention to provide an improved composition for use as active material within a positive electrode of a secondary electrochemical cell.

It is a further object to provide improved positive-electrode material that can be employed with a reduced amount of inert metal current collector.

It is also an object to provide a positive-electrode active material including iron disulfide that undergoes reduced expansion on discharge.

It is also an object to provide a positive electrode active material with iron disulfide that exhibits improved utilization of the active material.

In accordance with the present invention, a secondary electrochemical cell is presented that includes a negative electrode, a positive electrode including an improved active material and an electrolyte for providing ionic conduction between the electrodes. The improved positive-electrode, active material includes a major proportion by weight of iron disulfide and a minor proportion by weight of a polyvalent metal sulfide other than iron disulfide. In a more specific aspect of the invention, the polyvalent metal sulfide is a sulfide of a metal selected from the group of polyvalent metals consisting of cobalt, nickel, copper, manganese and cerium.

BRIEF DESCRIPTION OF THE DRAWINGS

The present invention is illustrated in the accompanying drawings wherein

FIGS. 3A and 3B are graphs of cell voltage vs percent theoretical capacity for several electrochemical cells described in Example IV. In FIG. 3A the positive-electrode active materials are, in curve A: $FeS_2$, curve B: $FeS_2$-$CoS_2$, curve C: $FeS_2$-$NiS$ and curve D: $FeS_2$-$Cu_2S$. In FIG. 3B the active materials are in curve A: $FeS_2$, curve E: $FeS_2$-$MnS$ and curve F: $FeS_2$-$Ce_2S_3$.

DETAILED DESCRIPTION OF THE PREFERRED EMBODIMENT

Figure 1:
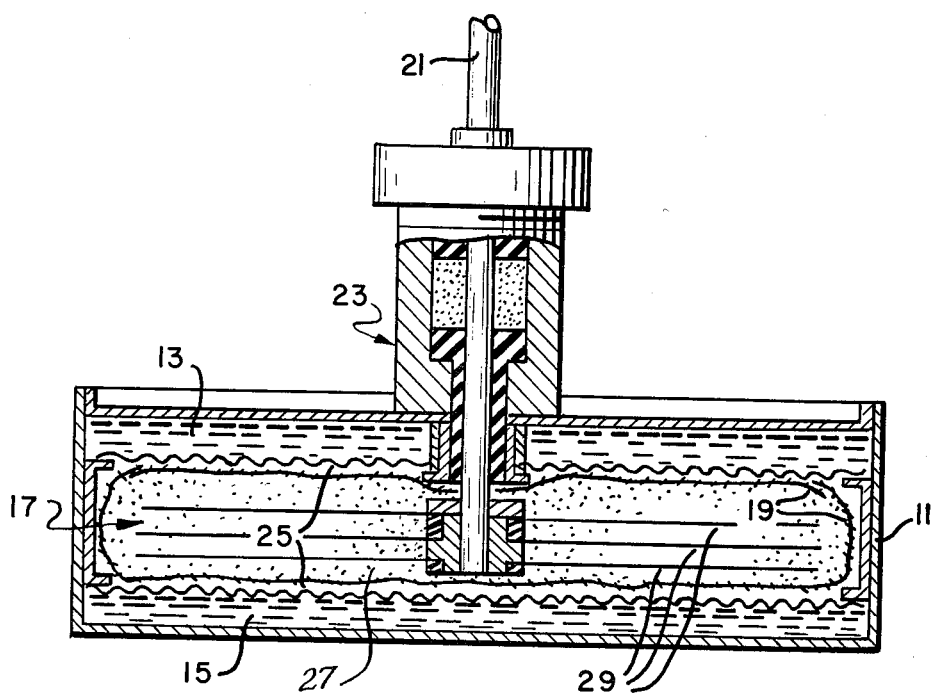
FIG. 1 is a cross-sectional view of a secondary electrochemical cell.

Referring now to FIG. 1, a secondary electrochemical cell is illustrated that has been used to demonstrate the present invention. It will be clear that various other cell configurations including many of those illustrated in the patents and applications cited above can also employ the improved positive-electrode material of the present invention. The cell is shown with an outer housing 11 of stainless steel or other inert material containing two negative electrodes 13 and 15 and a centrally disposed positive electrode 17. The electrodes are separated by an electrically insulated mesh, paper or fabric 19, for instance of boron nitride, that is shown enveloping the positive electrode 17. Most of the volume of the cell housing 11 not occupied by the electrodes and particularly that volume intermediate the positive and negative electrodes is filled with a molten electrolyte for ionic conduction between the electrodes. For clarity in the drawing, the molten electrolyte is not shown. The electrolyte used in the cell can be selected from known eutectic salt compositions that are molten at the cell operating temperatures. Electrolytes such as eutectic compositions of LiCl-KCl or LiCl-LiF-KBr and LiF-LiCl-LiI salts have been found to be suitable for this purpose. Various other suitable electrolytic salts can be selected from those listed in U.S. Pat. No. 3,488,221, cited above.

An electrical conductor 21 passes through the housing wall and an opening within the upper negative electrode into electrical contact with the central positive electrode 17. The conductor is supported and insulated from the cell housing by suitable electrical feedthrough structure 23. Electrical contact is made to the negative electrodes through the cell housing 11 through conventional electrical connections (not shown).

Negative electrodes 13 and 15 can be any one of a number of types such as illustrated in the patents and applications cited in the Background of the Invention. These negative electrodes can contain as active material a molten alkali metal such as lithium metal or sodium metal. Also, a solid alloy of lithium-aluminum, lithium-magnesium and other binary and ternary lithium alloys can serve as the active material. A molten, negative-electrode, active material will be contained within a porous substrate of, for instance, stainless steel or nickel. Solid alloy material, for instance lithium-aluminum alloy, can be formed by electrodepositing lithium onto a porous aluminum substrate. In addition, particulate solid alloy material can be distributed throughout a porous metallic substrate in order to provide a negative electrode. Screens or mesh 25 of an inert material such as stainless steel are illustrated at the negative electrode surfaces facing the positive electrode for structural support and retention of active material.

The structure of positive electrode 17 is not critical. It is illustrated in a form generally representative of the type employed in the cells given in the examples. As shown, it is enveloped by the porous, electrically insulative separator 19 of, for instance, boron nitride paper, cloth or fabric. The positive-electrode structure in general will include the positive-electrode active material 27, current collector material 29 and electrolyte.

As illustrated, several layers of current collector 29 are electrically connected to conductor 21 at their center and are embedded within a mixture of the active material and electrolyte. The current collector can be sheets, mesh, screens, foam layers or other forms of electrical conductors. In some embodiments, particulate current collector material can be used in combination with or in place of the illustrated layers. The current collectors are of an electrically conductive material that will not extensively corrode in contact with the electrolyte and electrode materials at the electrode potential, for instance of molybdenum, molybdenum alloys, tungsten or carbon.

The positive-electrode active material 27 can also be provided in a number of structural forms, for example, as solid particulate material or as a solid structure with porosity. In each instance, electrolyte is mixed or interspersed with or through the active material to provide ionic conduction to the current collector. In other structures, a porous current collector such as a felt or foam can be filled with the active material and electrolyte.

The active positive electrode material is a composition including a major weight proportion of iron disulfide and a minor proportion by weight of one or more other polyvalent metal sulfides. Each of the polyvalent metals, like iron, is capable of combining with sulfur in more than one state of oxidation. For example, sulfides of cobalt include $CoS$, $CoS_2$, $Co_3S_4$ and $Co_2S_3$. Often a polyvalent sulfide is conveniently provided and can be employed as a mixture of several stoichiometric compounds, e.g. mixtures of $CoS$ and $Co_3S_4$.

The composition of iron disulfide and the polyvalent sulfide can be prepared initially by a number of methods. In a typical manner employed for the cells described in the examples below, particulate mixtures of iron disulfide and the polyvalent metal sulfide were prepared and subsequently flooded with molten electrolyte within the cell. On cycling of the cell at the elevated operating temperature of 400° to 450° C., other ternary and perhaps more complicated systems of iron, polyvalent metal, sulfur and possibly other constituents are indicated. It is therefore contemplated that the positive-electrode active material can be prepared initially in various forms of ternary systems including a sulfide compound or berthollide with polyvalent metal substituted for a portion of the iron, a solid solution of the polyvalent metal sulfide and the iron disulfide, a eutectic composition of the constituents or various single and polyphase systems including the constituents.

A number of polyvalent metal sulfide additives have been found which can be combined with iron disulfide to improve the performance of the positive electrode. Additives such as sulfides of cobalt, cerium and nickel are highly conductive materials that reduce the resistance of the electrode. Some of these, such as cobalt and nickel sulfides as well as other sulfides that have higher resistivities, may react during cycling of the cell to provide an electrically conductive metal, e.g. Co, Ni, Cu. These polyvalent metal sulfides exhibit thermodynamic equilibrium potentials within the cell operating range, e.g. between 1.3 to 2.3 volts, IR free, versus lithium metal, in the formation of lithium sulfide and the electrically conductive metal. Other metal sulfides, such as those of manganese and cerium, that do not exhibit similar equilibrium potentials can possibly improve cell performance in combination with other electrode materials. A number of the polyvalent metal sulfides may interact with other materials within the positive electrode at operating temperature and potential to form electrically conductive phases or merely phases that exhibit reduced diffusional resistance within the positive electrode.

The improved active materials with low ohmic resistance (as opposed to diffusional resistance) can operate with reduced amounts of expensive current collector material at increased power output. Reduction in diffusional resistance leads to improved utilization of the active material.

Table I lists a number of metal sulfide additives that are contemplated for combining with iron disulfide to reduce both ohmic and diffusion resistance of a positive electrode. Resistivities are given where available for comparison with the resistivity of $FeS_2$ which is $3.88 \times 10^{-2}$ at 340° C.

TABLE I

| Additive | Resistivity Ohm-cm at 450° C. |
|---|---|
| $TiS_2$ | $1.0 \times 10^{-2}$ |
| $Ti_2S_3$ | — |
| TiS | — |
| $CoS_2$ | $2.2 \times 10^{-4}$ |
| $Co_2S_3$ | — |
| CoS | — |
| $Co_3S_4$ | — |
| $V_2S_3$ | $10^2$ |
| $Cr_2S_3$ | 0.1 |
| MnS | 10 (single crystal of α-MnS) |
| $MnS_2$ | — |
| CdS | 10 |
| ZnS | $2 \times 10^{-6}$ |
| $Ce_2S_3$ | $5 \times 10^{-4}$ |
| CeS | $1.4 \times 10^{-4}$ |
| $Cu_2S$ | $3 \times 10^{-2}$ (400° C.) |
| $Sb_2S_3$ | 2.7 (510° C.) |
| PbS | $6.1 \times 10^{-3}$ (340° C.) |
| $MoS_2$ | $2.1 \times 10^{-1}$ (102° C.) |
| $Mo_2S_3$ | — |
| $NiS^2$ | $10^{-2}$ |
| $NiS^2$ | $1.6 \times 10^{-4}$ |
| $Ni_3S_4$ | — |
| $Ni_3S_2$ | — |

Figure 2:
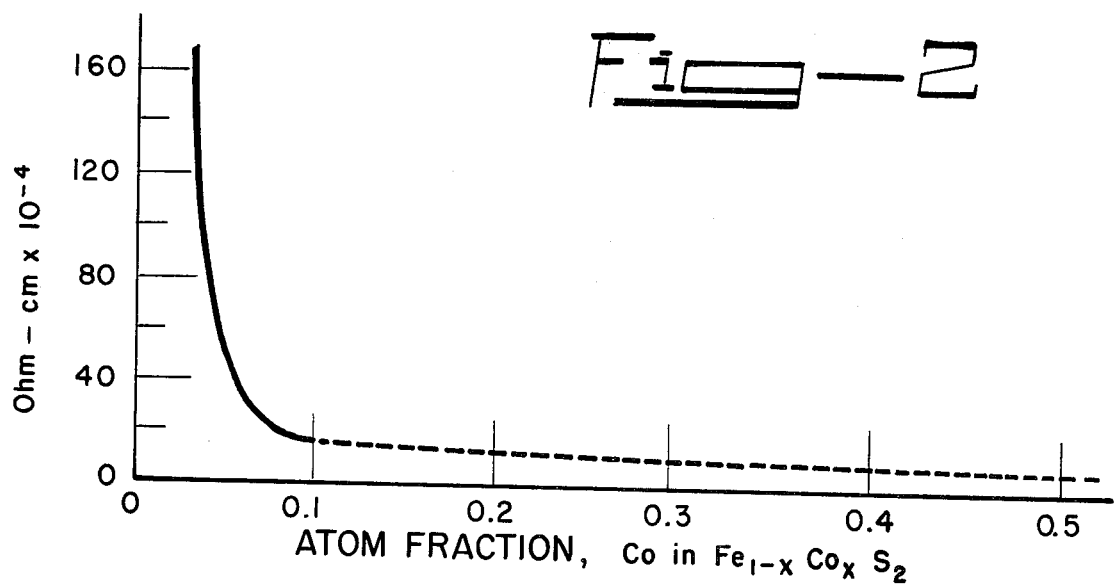
FIG. 2 is a graph of resistivity vs atom fraction $(x)$ of Co in $Fe_{1-x}Co_xS_2$.

One manner of determining the amount of metal sulfide additive to be included is through the reduction in resistivity of the mixture of the positive-electrode active material. Literature values for the $Fe_{1-x}Co_xS_2$ system indicate that cobalt sulfide additions up to about 0.10 atom fraction produce a substantial reduction in resistivity, while a somewhat more gradual reduction is produced by additions beyond 0.10 atom fraction. This relationship is clearly shown in the graph of FIG. 2. For this ternary system of Fe-Co-$S_2$, atom and weight fraction of iron and cobalt are approximately the same.

In order to demonstrate the present development, a number of electrochemical cells have been operated in the laboratory with various positive-electrode, active materials. These cells are illustrated in the following examples.

Reduction in Current Collector

EXAMPLE I

Two laboratory electrochemical cells, each having a single negative electrode and a single positive electrode, were assembled for operation with a particulate mixture of $FeS_2$ and $Co_2S_3$ as positive-electrode, active material. One of the cells (FC-1) employed three molybdenum screens brazed to a central molybdenum rod as a positive electrode current collector. An external molybdenum basket maintained at positive potential, but separated from the electrode active material by a zirconia fabric, was used to define the electrode geometry.

The second cell (FC-2) used a single molybdenum screen and central molybdenum rod to test the effect of reduced amounts of current collector material. This electrode also eliminated the molybdenum basket through use of a stainless steel basket maintained at negative electrode potential. Other characteristics of the two cells are given below in Table II.

TABLE II

| Cell | FC-1 | FC-2 |
|---|---|---|
| Positive Electrode | | |
| $FeS_2$ | 20.5 g | 19.95 g |
| $CO_2S_3$ | 2.0 g | 2.21 g |
| Area | 23.1 cm² | 22.8 cm² |
| Volume | 23 cm² | 20.6 cm² |
| Current Collector | 3 Mo screens | 1 Mo screens |
| Capacity ($FeS_2$) | 18.3 A-hr | 17.8 A-hr |
| Capacity ($CO_2S_3$) | 1.5 A-hr | 1.66 A-hr |
| Negative Electrode | | |
| Material | Li-Al | Li-Al |
| Capacity | 27.2 A-hr | 26.71 A-hr |
| Area | 38.3 cm² | 38.3 cm² |
| Operating Temperature | 450° C. | 450° C. |

Both the cells were operated through nearly identical cycling programs with discharge voltages of about 1.6 to 0.7, capacity densities of 0.7 to 0.2 A-hr/cm² and current densities ranging from 20 ma/cm² to 700 ma/cm². These measurements showed there was no significant difference between the performance of the two cells. The operation of these cells shows that a substantial reduction in the amount of molybdenum current collector can be made with cells employing iron disulfide with a sulfide of cobalt additive as positive-electrode, active material.

Comparative Resistance and Capacity

EXAMPLE II

Two electrochemical cells similar in construction to the cell illustrated in FIG. 1 were operated for extended periods of time in excess of 1500 hours and 70 cycles each. In the first cell (W-5) only $FeS_2$ was employed as the positive electrode active material, while the second cell included a particulate mixture of $FeS_2$ and about 10 weight percent of a sulfide of cobalt having a nominal composition of $Co_2S_3$. Analysis indicated the composition was predominantly CoS with small quantities of $Co_3S_4$. Additional data regarding the two cells is given below in Table III.

TABLE III

| Cell No. | W-5 | W-10 |
|---|---|---|
| Positive Electrode | | |
| wt of active materials, $FeS_2$, g | 170 | 170 |
| $Co_2S_3$, g | 0 | 17.5 |
| Theoretical capacity, A-hr | 151 | 150 |
| Diameter, cm | 12 | 12 |
| Thickness, cm | 1 | 1 |
| wt of Mo current collector, screen and rod, g | 63 | 63 |
| Negative Electrode | | |
| wt of Li-Al alloy, g | 223 | 200 |
| Theoretical capacity, A-hr | 150 | 150 |
| wt of S.S. screen and ring | 45 | 45 |
| Diameter, cm | 12.8 | 12.8 |
| Thickness (each), cm | 1.0 | 1.0 |
| Electrolyte | LiCl-KCl | LiCl-KCl |
| wt. g | 401 | 480 |
| Operating temperature, ° C. | 450 | 450 |
| Cutoff Voltages | | |
| Charge | 2.35 | 2.15 |
| Discharge | 0.7 | 0.85 |

As shown in the table, the cells include essentially the same mass of molybdenum current collector material. Resistance measurements made on the cells in the charged state showed an ohmic resistance of 8 milliohms in cell W-5 and only 5 milliohms in cell W-10. This reduction in ohmic resistance is attributed to the increased conductivity of the positive-electrode active material including the sulfide of cobalt. Table III also shows a substantially lower charge cutoff voltage for cell W-10 than for cell W-5. The lower charge potential reduces the corrosivity of the electrode environment and may permit use of a less noble current collector material than molybdenum. Notwithstanding the lower charge cutoff along with higher discharges cutoffs, cell W-10 exhibited a capacity of about 115 amp hours at 5 and 7 amperes discharge and 450° C. operating temperature throughout a major portion of its life. This corresponds to a utilization of approximately 77 percent. At these same current levels, cell W-5 without the sulfide of cobalt additive produced only 80 to 90 amp hours corresponding to a utilization of about 57 percent. This increase in capacity within a reduced range of cutoff voltages is attributed to the sulfide of cobalt additive within the positive-electrode active material.

EXAMPLE III

A third cell (W-11) of a construction substantially the same as that illustrated in FIG. 1 and described in Example II included a positive-electrode active material of $FeS_2$ — 10 wt. % $Co_2S_3$ (nominal composition). However, only ⅓ the number of current collector layers and ½ the mass of molybdenum material was included in the positive electrode compared to the positive electrodes of cells W-5 and W-10. Resistance measurements made on this cell showed an ohmic resistance in the charged state of 4.5 milliohms. This clearly indicates that through use of the positive-electrode active material of the present invention a substantial reduction in the mass of current collector material can be made without detrimental effects.

Other Additive Materials
EXAMPLE IV

A number of experimental cells were operated, each having one positive and one negative electrode with LiCl-KCl electrolyte between the electrodes. The negative electrodes were of Li-Al alloy electrochemically formed on a porous compact of aluminum wire with a theoretical capacity of about 19 A-hr. The aluminum wire compacts were about 7.6 cm diameter and contained about 25 grams of aluminum. Each of the positive electrodes were about 20 cm square area and an average thickness of about ¾ cm. Each included particulate active material, electrolyte and one layer of molybdenum mesh as current collector material. The active material was of particle sizes of between 75 and 180 U.S. standard mesh. The positive-electrode, active material in the first cell was $FeS_2$ alone. In each subsequent cell, a metal sulfide additive in an amount of 15 atom % was included with the $FeS_2$. In each cell, the total weight of the positive-electrode active material was 14 grams.

During the test the cells were operated between 20 and 40 cycles for about 300 to 550 hours at different current levels (1A, 2A or 3A) and two temperature levels (typically 400° C. and 450° C.). Various characteristics of each of the cells are tabulated below in Table IV.

TABLE IV

| Additive | Wt. % Additive | Theo. Capacity, A-hr | $FeS_2$, A-hr | Additive, A-hr |
|---|---|---|---|---|
| None | 0 | 12.5 | 12.5 | 0 |
| $TiS_2$ | 14.1 | 12.6 | 10.7 | 1.9 |
| $CoS_2$ | 15.3 | 12.5 | 10.6 | 1.9 |
| $V_2S_3$ | 12.3 | 11.0* | 11.0 | 1.4 |
| $Cr_7S_8$ | 12.9 | 12.4 | 10.9 | 1.5 |
| MnS | 11.3 | 11.1* | 11.1 | 1.0 |
| CdS | 17.5 | 11.2 | 10.3 | 0.9 |
| CaS | 9.6 | 12.3 | 11.3 | 1.0 |
| ZnS | 12.5 | 11.9 | 10.9 | 1.0 |
| $Ce_2S_3$ | 21.7 | 9.8* | 9.8 | 1.3 |
| NiS | 11.8 | 12.0 | 11.0 | 1.0 |
| $Cu_2S$ | 10.5 | 11.7 | 11.2 | 0.5 |

*Since the additive is thermodynamically nonreactive between the cell cutoff potentials, the capacity of the additive is not included in the theoretical capacity.

The results of these tests for the positive-electrode, active material including $FeS_2$ alone and five of the more promising additive materials are shown in FIGS. 3A and 3B. These figures are discharge curves at 2 amps current and 450° C. showing utilization as a percentage of theoretical capacity versus cell discharge voltage. In FIG. 3A, curve A corresponds to $FeS_2$, curve B to $FeS_2$-$CoS_2$, curve C to $FeS_2$-NiS, curve D to $FeS_2$-$Cu_2S$, and in FIG. 3B curve A again corresponds to $FeS_2$, curve E to $FeS_2$-MnS, curve F to $FeS_2$-$Ce_2S_3$ as the positive-electrode active material within the respective cells.

Most of the remaining cells having other positive electrode additive materials exhibited performances not substantially better than that of $FeS_2$ alone. However, the cell including zinc sulfide additive did provide good improvement in the present utilization of active material at the lower voltage plateau of 1.2 volts and below.

It is therefore seen from the results presented in FIGS. 3A and 3B that the addition of each of the sulfides of five polyvalent metals provides a substantial and unexpected improvement in the utilization of active material in a positive electrode including a major proportion of $FeS_2$.

Reduced Electrode Swelling
EXAMPLE V

Figure 4:
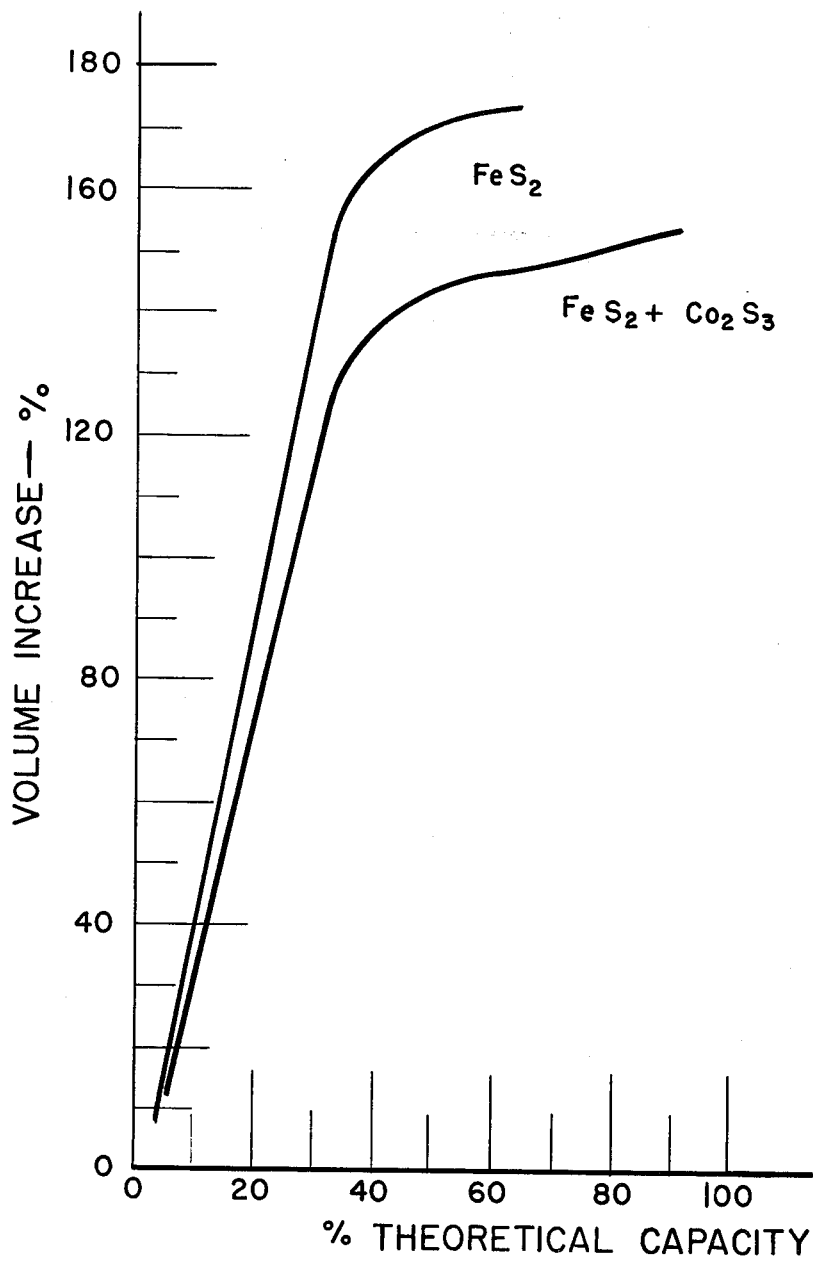
FIG. 4 is a graph of percent volume increase vs percent theoretical capacity for the positive electrodes of Example V.

Two electrochemical cells, each with Li-Al alloys as negative electrode material and LiCl-KCl electrolyte were operarted through their first discharge cycle at 50 ma/cm² at a temperature of 425° C. Measurements of axial expansion were made on the positive electrode of each cell during this first cycle of operation. The first cell included particulate $FeS_2$ as the active positive electrode material, while the second cell included $FeS_2$ — 16 wt. % $Co_2S_3$. The results of these tests are shown in FIG. 4 with the cell employing $FeS_2$-$Co_2S_3$ as active material exhibiting both a higher utilization of active material as well as about a 15 to 20% reduction in volume expansion.

It will be clear from the above that the present invention provides an electrochemical cell including an improved positive electrode active material. The use of this active material provides a number of unexpected benefits not realized by previous cells employing only particulate $FeS_2$. Among these benefits are improved utilization of the active material, reduced swelling of the electrode and reduced electrode resistance which can result in higher power output and a reduction in the required amount of current collector material.

The embodiment of the invention in which an exclusive property or privilege is claimed are defined as follows:

1. In a secondary electrochemical cell including a negative electrode with alkali metal as active material, a positive electrode with a positive-electrode, active material and a molten salt electrolyte intermediate said positive and negative electrodes, the improvement wherein said positive-electrode, active material comprises iron disulfide in a major proportion by weight and a sulfide of cobalt in an amount sufficient to provide a cobalt to iron atom fraction in excess of about 0.1.

2. The electrochemical cell of claim 1 wherein said sulfide of cobalt is included in a sufficient amount to provide a cobalt to iron atom fraction of about 0.1 to 0.15.

* * * * *